(12) United States Patent
Graf

(10) Patent No.: US 6,507,780 B2
(45) Date of Patent: Jan. 14, 2003

(54) CONTROLLER FOR THE DRIVE TRAIN OF A MOTOR VEHICLE

(75) Inventor: Friedrich Graf, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/082,332

(22) Filed: Feb. 25, 2002

(65) Prior Publication Data

US 2002/0107626 A1 Aug. 8, 2002

Related U.S. Application Data

(63) Continuation of application No. PCT/EP00/08196, filed on Aug. 22, 2000.

(30) Foreign Application Priority Data

Aug. 24, 1999 (EP) .............................................. 99116567

(51) Int. Cl.[7] .............................................. G06F 17/00
(52) U.S. Cl. .............................. 701/51; 701/53; 701/54; 701/55; 701/56; 701/57; 701/58; 477/107; 477/109
(58) Field of Search .............................. 701/58, 57, 52, 701/53, 54, 55, 56; 477/109, 110, 107, 102, 33, 93, 98, 155

(56) References Cited

U.S. PATENT DOCUMENTS 5,390,117 A  2/1995 Graf et al.
6,128,564 A  10/2000 Graf

FOREIGN PATENT DOCUMENTS

| DE | 33 34 711 A1 | 4/1985 |
|---|---|---|
| DE | 38 31 449 A1 | 3/1990 |
| DE | 44 34 111 A1 | 3/1996 |
| DE | 196 16 960 C2 | 11/1997 |
| DE | 196 37 210 A1 | 3/1998 |
| DE | 196 48 055 A1 | 6/1998 |
| DE | 197 26 214 A1 | 12/1998 |
| DE | 197 27 044 A1 | 2/1999 |
| EP | 0 576 703 B1 | 11/1994 |
| EP | 0 638 742 A1 | 2/1995 |

OTHER PUBLICATIONS

Graf, F. et al.: "Advanced Transmission Control with Fuzzy Logic", ATA, Mar. 1995, pp. 378–389.

Fischer, R. et al.: "Automatisierung von Schaltgetrieben" (Automation of Transmissions), Mar. 1998.

*Primary Examiner*—Richard M. Camby
(74) *Attorney, Agent, or Firm*—Laurence A. Greenberg; Werner H. Stemer; Gregrory L. Mayback

(57) ABSTRACT

The controller for a drive train, with engine and transmission controllers has: a detection circuit with which respective driving situations of the motor vehicle and driver's characteristics are determined, and a control device for the clutch which, when the motor vehicle starts, is adapted to the driving situation which is determined and/or the driver's characteristics. When the motor vehicle starts (accelerates from standstill), the control device transfers, to the engine controller, signals with which the engine speed is stored according to stored characteristic curves.

12 Claims, 3 Drawing Sheets

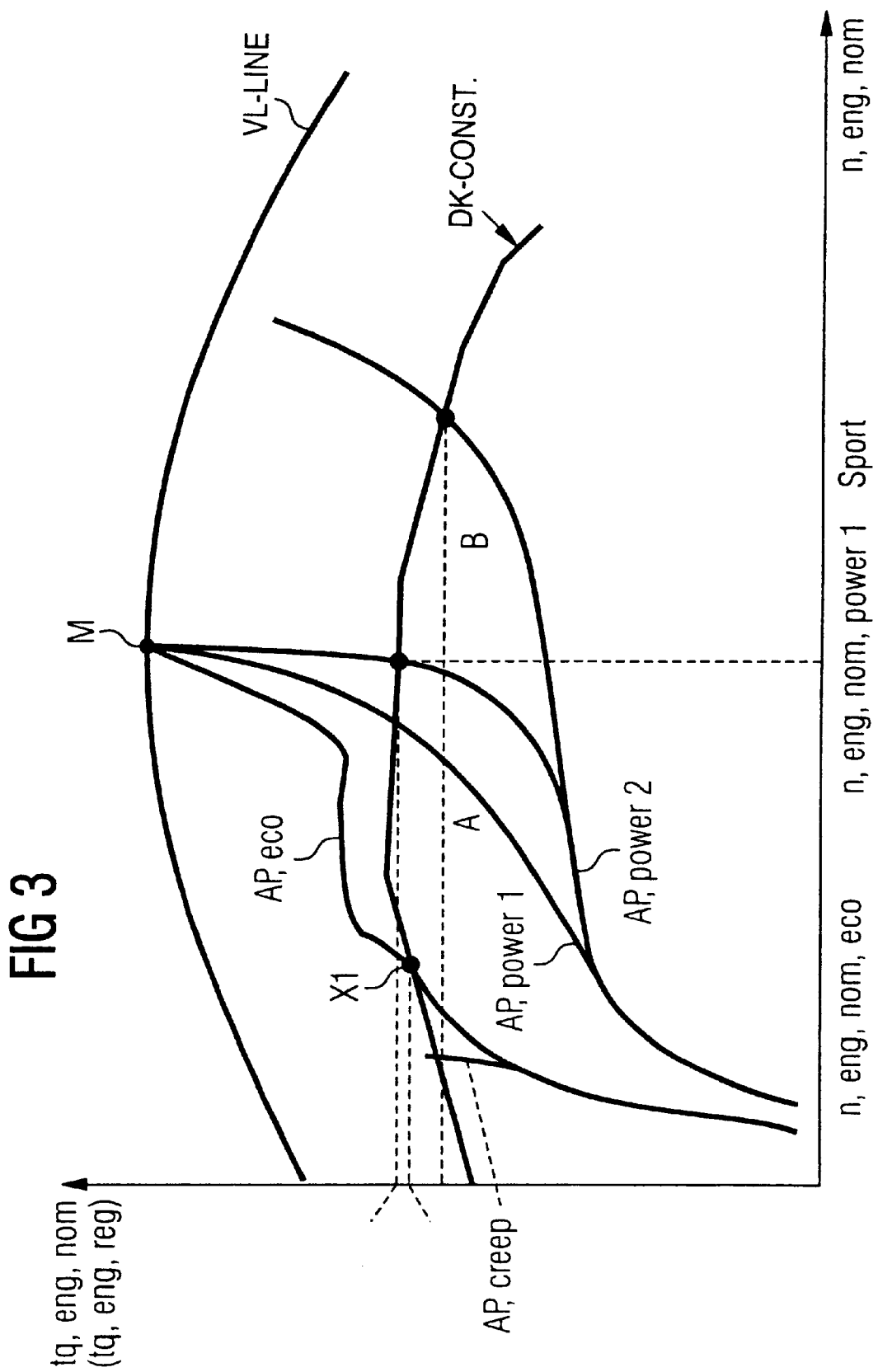

CONTROLLER FOR THE DRIVE TRAIN OF A MOTOR VEHICLE

CROSS-REFERENCE TO RELATED APPLICATION

This application is a continuation of copending International Application PCT/EP00/08196, filed Aug. 22, 2000, which designated the United States.

BACKGROUND OF THE INVENTION

Field of the Invention

The invention relates to a controller for the drive train of a motor vehicle (drive train controller). The motor vehicle has an engine, a transmission, and an automatically activated clutch. An engine controller controls variables which influence the torque of the engine, and a transmission controller controls the gear-shifting operations of the automatic transmission and exchanges data with the engine controller which permit comfortable operation of the motor vehicle.

In a drive train controller described in my prior U.S. Pat. No. 6,128,564 (see German patent application DE 197 27 044 A1), only physically dimensioned descriptive variables which relate to the required engine torque reduction are exchanged via an interface between the transmission controller and the engine controller. The transmission controller determines the behavior of the engine system on the basis of a generalized model. The model unambiguously describes the behavior required of the transmission controller at the limits of the engine/transmission system (engine output shaft) without relating to the technical implementation in the engine system.

The practical implementation of an intervention into an engine is the responsibility of the engine controller alone. It defines whether an intervention into the ignition has to take place or whether the quantity of fuel injected is reduced or whether the valve control times or valve characteristics are changed or whether the engine is to be controlled by means of the throttle valve. The engine controller alone also controls all the actuators necessary for this purpose. In the known transmission controller, no particular measures are provided for the starting of the motor vehicle.

A prior art automatically actuated clutch is moved by a hydraulic actuator between a fully disengaged position, via positions in which slip occurs in the clutch, into a fully engaged position (see U.S. Pat. No. 5,993,355 and German application DE 44 34 111 A1). The contact point of the clutch is determined and the position assumed here by the actuator is stored. The engine speed at the contact point is regulated to a rotation speed which lies somewhat above the rotational speed of the output shaft of the clutch and the actuator is adjusted to the position corresponding to the contact point.

In a system which is also known for the common control of a servo clutch (assisted clutch) and a vehicle engine, the clutch and the engine are controlled in the range of low vehicle speeds, for example when starting up, in such a way that the position of the accelerator pedal specifies the acceleration or the speed of the vehicle while, outside the starting operation, the drive train is controlled in a power-scaled or torque-scaled fashion as a function of the position of the accelerator pedal (see German patent application DE 197 26 214 A1).

In a device for automatically setting a clutch in a drive train with an engine speed regulating circuit and a clutch torque regulating circuit, the maximum achievable engine torque assuming the highest possible level of engine torque is determined (see German patent DE 196 16 960 C2). A limiter limits the accelerator-pedal-position-dependent setpoint value for the clutch torque regulating circuit to a maximum value which is at maximum as large as the maximum achievable torque communicated to the limiter.

The information which is supplied by a detection circuit for the starting situation and the driver's characteristics is not taken into account for controlling a starting operation in any of the three last-mentioned controllers.

The invention is based on the object of providing a drive train controller in which automatic starting of the motor vehicle is carried out as reliably and comfortably as possible taking into account the respective starting situation. This drive train controller is provided for motor vehicles with automatic transmission, both of the planetary wheel type and of the CVT type, in particular for those with an automated manual shift transmission in which the driver determines the gear to be engaged or the transmission ratio, but the gear-shifting operation is carried out automatically by the transmission controller.

SUMMARY OF THE INVENTION

It is accordingly an object of the invention to provide a drive train controller, which overcomes the above-mentioned disadvantages of the heretofore-known devices and methods of this general type.

With the foregoing and other objects in view there is provided, in accordance with the invention, a controller for a drive train of a motor vehicle having an engine, a transmission, and an automatically activated clutch, comprising:

an engine controller configured to control variables influencing a torque of the engine;

a transmission controller configured to control gear-shifting operations of the automatic transmission and connected to the engine controller for exchanging with the engine controller data permitting a comfortable operation of the motor vehicle;

a detection circuit connected to the transmission controller for determining a respective driving situation of the motor vehicle and a driver's characteristics;

a control device for controlling the clutch, the control device being adaptively controlled with respect to one of the driving situation determined by the detection circuit and the driver's characteristics when the motor vehicle starts; and the control device, when the motor vehicle starts, transferring to the engine controller signals with which the engine speed is controlled according to stored characteristic curves.

In accordance with an added feature of the invention, the detection circuit forms a part of the transmission controller, and the control device forms a part of the transmission controller.

In accordance with an additional feature of the invention, a switching controller is provided for calculating a setpoint wheel torque from a position of an accelerator pedal, the switching controller controlling an engine torque with reference to the setpoint wheel torque.

In accordance with another feature of the invention, the detection circuit for detecting the respective driving situation of the motor vehicle forms a part of the engine controller.

In accordance with a preferred embodiment of the invention, the detection circuit comprises a fuzzy logic system.

In accordance with again an added feature of the invention, a characteristic diagram memory stores characteristic curves for controlling the clutch upon starting and upon maneuvering of the motor vehicle.

In accordance with again an additional feature of the invention, the characteristic diagram memory stores a plurality of characteristic curves corresponding to different starting situations of the motor vehicle.

In accordance with again another feature of the invention, a fuzzy logic system is provided for generating an engine setpoint rotational speed with reference to at least one parameter selected from the group consisting of an engine setpoint torque, a parameter characterizing the driver, and a parameter characterizing a loading of the vehicle.

In accordance with again a further feature of the invention, characteristic curves in the form of a profile of the engine speed are stored in the switching controller as a function of the setpoint engine torque and of the time. Preferably, a rotational speed regulator is contained in the clutch controller for setting a setpoint engine torque with reference to a characteristic curve.

In accordance with a concomitant feature of the invention, the drive train controller is configured with a creeping mode controlled according to a characteristic curve.

The drive train controller of a motor vehicle with an engine and an automatic transmission is provided with an engine controller by means of which variables which influence the torque of the engine are controlled, and with a transmission controller by means of which the gear-shifting operations of the automatic transmission are controlled and by means of which data which makes comfortable operation of the motor vehicle possible is exchanged with the engine controller. Here, the transmission controller is provided with a detection circuit which determines the respective driving situation of the motor vehicle and the driver's characteristics. It also has a control device for the clutch which is adapted to the driving situation which is determined and/or to the driver's characteristics when the motor vehicle starts. When the motor vehicle starts, the control device transfers, to the engine controller, signals with which the engine speed is controlled according to stored characteristic curves.

Driving situations are expediently detected with a detection circuit which is embodied as a fuzzy logic circuit. Advanced transmission controllers are in any case frequently provided with fuzzy logic components (see for example F. Graf and H. Weil: Advanced Transmission with Fuzzy Logic, 3rd International Conference, Bologna, Mar. 29–31 1995, Technical Papers pp. 379–89; and U.S. Pat. No. 5,390,117 and European published patent application EP 0 576 703 A1) and can therefore easily be equipped with such a driving situation detection means.

The advantages of the invention are, above all, the improvement which it makes possible in comfort, safety and economy when starting a motor vehicle under a very wide range of ambient conditions, such as when starting on an incline, when maneuvering and when performing parking maneuvers. Further advantages are given in the following description.

Other features which are considered as characteristic for the invention are set forth in the appended claims.

Although the invention is illustrated and described herein as embodied in a controller for the drive train of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is graph of the profile of such characteristic curves in another exemplary embodiment of the drive train controller according to FIG. 1.

DESCRIPTION OF THE PREFERRED EMBODIMENTS

Modern transmission controllers can acquire or calculate, with their own sensor systems or by means of signals of sensors which are present in any case in the motor vehicle and are made available via a CAN network, a series of information items which render effective operation of the drive train possible (cf. Graf and Weil, "Advanced Transmission Control with Fuzzy Logic" 3rd Int. Conference, Vehicle Comfort and Ergonomics, Bologna, March 95). The information characterizes the driving style of the driver, the gradient of the underlying surface and/or the loading of the motor vehicle. In addition to this there may be information relating to a degree of wheel slip which is occurring. With the drive train controller according to the invention, essentially more comprehensive use is made of this information in order to control a drive-away clutch and an automatic starting operation with adaptation to the respective driving situation in such a way that the safety, comfort, and the economy of the operation of the motor vehicle are ensured.

Figure 1:
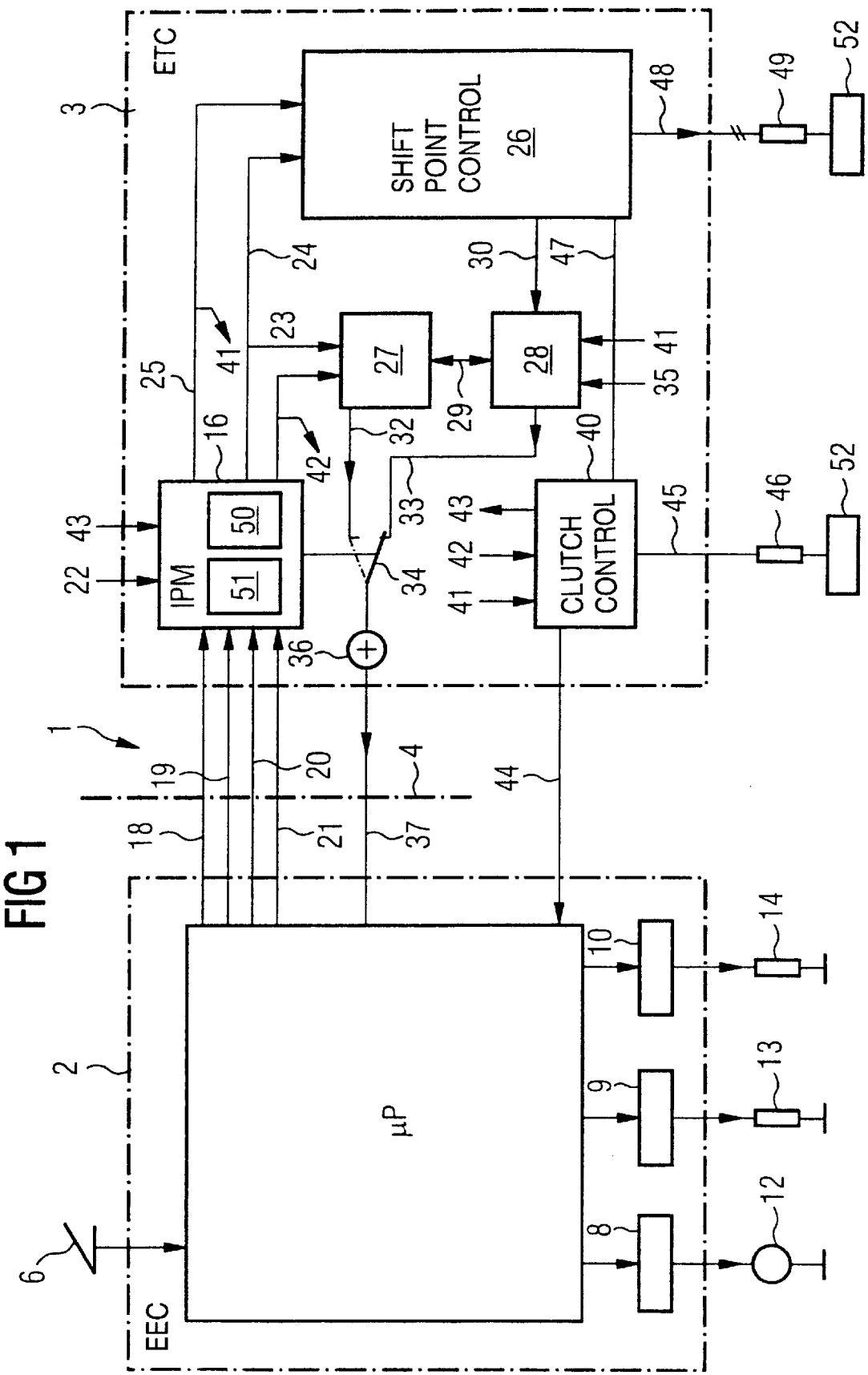
FIG. 1 is a schematic diagram of a drive train controller according to the invention.

Referring now to the figures of the drawing in detail and first, particularly, to the schematic block diagram of FIG. 1, there is shown a drive train controller 1 of a motor vehicle. The controller 1 contains an electronic engine controller (EEC) 2 and an electronic transmission controller (ETC) 3 which communicate with one another via an interface 4 by exchanging data relating to operational variables of the motor vehicle and control signals, in particular in the form of physical descriptive variables. The transmission controller 3 also contains a clutch control system to be described below. For the sake of completeness, the unit ETC should be referred to as a transmission and clutch controller 3 but will, in the following be referred to as a transmission controller.

The engine controller 2 receives signals from an accelerator pedal 6 and it has three control signal outputs: a signal output 8 for the throttle valve, a signal output 9 for the fuel injection, and a signal output 10 for controlling the ignition angle of a motor vehicle engine. An electric motor 12 which activates the throttle valve of the motor vehicle is controlled using the signal output 8. Actuators 13 and 14 (which are embodied, for example, as piezoelectric or inductive actuators) are controlled using the signal outputs 9 and 10 and set the quantity of fuel to be injected and the ignition angle of the engine.

The transmission controller 3 contains the following components: a switching controller or IPM controller 16 which carries out integrated, i.e. comprehensive control of the drive train (IPM stands for Integrated Powertrain Management) and in particular defines the switching strategy. It receives data relating to various values of the engine torque via lines 18, 19 and 20 from the engine controller 2. Via a line 21, it receives information relating to the engine setpoint torque predefined by the driver of the motor vehicle or else relating to the position of the accelerator pedal 6.

Via a line 22, the IPM controller 16 receives the respective output rotational speed of the transmission, which corresponds to the rotational speed of the wheels and thus—in a predefined ratio—the speed of the motor vehicle. Via a branching signal line 23, 24, the IPM controller 16 transmits a target gear speed to be set or a target transmission ratio to a gear-shift transition controller 26 (labeled in the drawing as a and to a first decision circuit 27 as well as to a second decision circuit 28. These two decision circuits are connected to one another by a bidirectional line 29.

All the relevant information relating to the driving strategy and the respective driving situation are fed via a line 25 to the gear-shift transition controller 26. The latter transmits, to the second decision circuit 28 via a line 30, control signals with which, for example, the deviation over time of the engine torque, i.e. the speed with which the engine torque is changed, is controlled.

In each case one signal output of the first and second decision circuits 27, 28 is connected to terminals of a switch 34 via signal lines 32 and 33, respectively. The switch 34 controlled by the IPM controller 16 connects either the output of the first decision circuit 27 or the output of the second decision circuit 28 via a line 37 to the engine controller 2, i.e. in particular to a microprocessor 38 of the engine controller, is connected. Instead of the switch 34, it is also possible to provide an adder 36 by means of which the signals on the lines 32 and 33 are added and whose output is also connected to the engine controller 2 via the line 37. Via the line 37, the transmission controller 3 communicates the requested engine torque to the engine controller 2.

Via a line 35, a timing clock is applied to the second decision circuit 28. With the timing clock the control of the transmission controller 3 can be separated from the control of the controller 2.

The engine torque requested by the driver is applied to the line 21. This is referred to as the driver's desired torque and is corrected, outside a gear-shifting operation, by the IPM controller 16. It is corrected by the gear-shift transition controller 26 during a gear-shifting operation. The switch 34 thus distinguishes between the control outside a gear-shifting operation and the control within or during a gear-shifting operation.

A clutch controller 40—preferably embodied as a clutch regulator—receives all the relevant information relating to the driving strategy and the respective driving situation from the IPM controller 16 via a line 41 which branches off from the line 25, and information relating to the target position or the target torque of the clutch which is required when the motor vehicle is starting, via a line 42. Via the line 41, the clutch controller 40 receives information relating to the respective driving strategy and driving situation. Via the line 42, it receives information relating to the target position of the clutch and the engine torque to be transmitted, which is important, for example, when starting. The clutch controller 40 itself transmits the actual clutch position or the corresponding clutch torque to the IPM controller 16 via a line 43 and to the engine controller 2 via an output line 44.

The line 41 is also connected to the second decision circuit 28, with the result that all the relevant information relating to the driving strategy and the respective driving situation are also fed to it. The profile of the (signal) lines 41 and 42 is only indicated in the drawing for the sake of better clarity.

The clutch controller 40 is connected by a control line 45 to a clutch actuator 46 which controls a clutch 52. The control of the clutch is coordinated with the gear-shifting operation (in an automated manual shift transmission or AMT transmission) via a line 47 which connects the gear-shifting transition controller 26 to the clutch controller 40.

The gear-shift transition controller 26 is connected by means of a plurality of control lines 48, which are illustrated here as a multiple line, to electromechanical or electrohydraulic transmission actuators 49 which carry out the gear speed change in a transmission 53 by activating gear-shifting forks of the transmission 53 in a known fashion. These transmission actuators convert the controlling instructions into longitudinal and rotary movements of the gear-shifting forks. A rotary movement is used to engage or disengage a transmission gear speed, a longitudinal movement is used to select the gate. Details of the gear speed actuators in the transmission are known per se (see for example R. Fischer and R. Berger (LUK), Automatisierung von Schaltgetrieben [Automation of Variable Speed Transmissions], in the report of the VDI Conference "Getriebe und Fahrzeuge [Transmissions and Vehicles]", 19–20.03.1998, page 95 et seq.).

The transmission controller 3 is provided with a detection circuit 50 which is used to detect the respective driving situations of the motor vehicle such as: starting, maneuvering, acceleration, driving at a uniform speed or deceleration, driving uphill or downhill, cornering, driving within a built-up area, on country roads or motorways, driving under wintry road conditions etc. The detection circuit 50 is embodied in the present exemplary embodiment as a fuzzy logic computer or regulator and is a component of the IPM controller 16. It evaluates sensor signals which are present in any case in the transmission controller 3 and are evaluated by it, as is explained in the paper cited at the beginning by F. Graf and H. Weil and in the above-mentioned U.S. Pat. No. 5,390,117 and European patent application EP 0 576 703 A1.

The transmission controller 3 is also provided with a characteristic diagram store 51, that is a characteristic field memory 51, which contains characteristic curves that are used to control the drive train—and in particular the clutch 52—with adaptation to the respective ambient and starting situations when the motor vehicle starts. The characteristic diagram store 51 is a component of the IPM controller 16 in the present exemplary embodiment. The IPM controller 16 is a central and most important part of the controller of the drive train; it coordinates the operation of all its individual components. For this reason, it is also referred to as a metacontroller. The IPM controller 16 is illustrated here as being contained in the transmission controller 3, but this is not necessary. It can also be accommodated elsewhere, for example in the engine controller 2.

Reliable detection of the current driving situation or driving maneuver is decisive for individual optimization of the drive train controller 1 according to the criteria which are decisive in the respective situation. As a result of the detection of the driving situation within the adaptive gear-shifting strategy which is implemented by the IPM controller 16, it is possible to classify driving performance requests not only in terms of their intensity but also in terms of their dynamic requirements. It detects in particular starting situations and their variants such as maneuvering, starting on an incline, stop-and-go driving etc.

Figure 2:
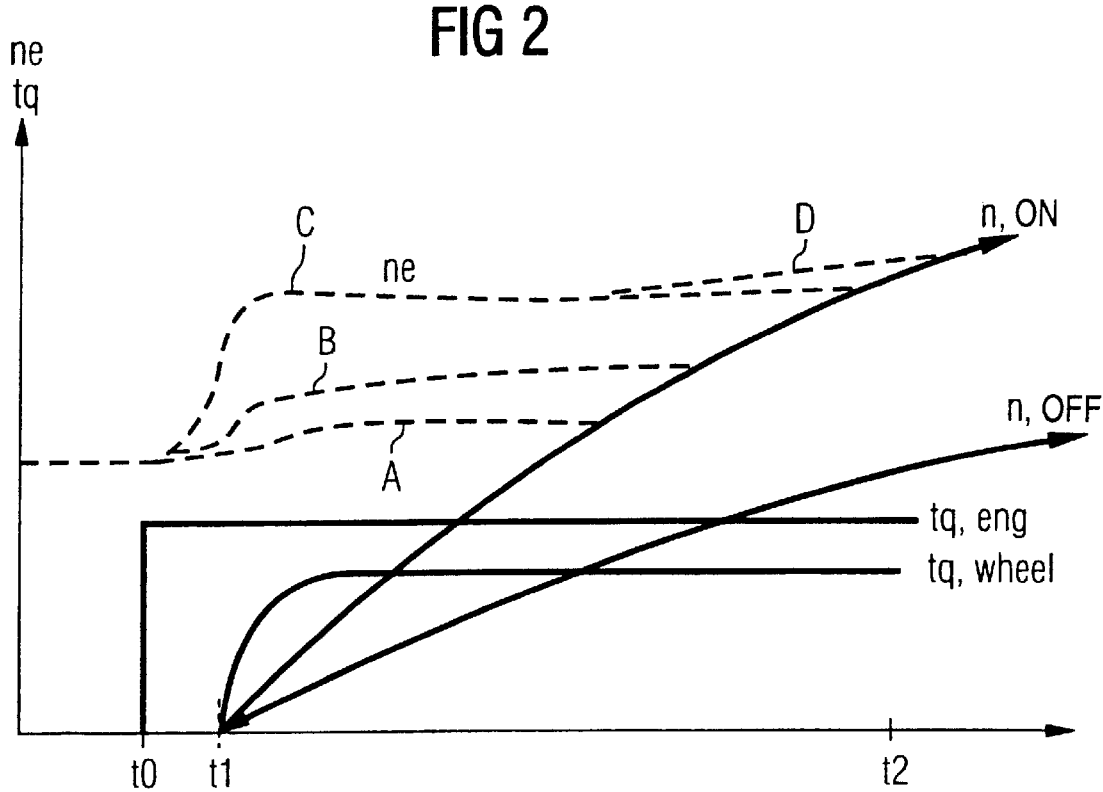
FIG. 2 is a graph of a time-dependent profile of characteristic curves, representing engine speeds and engine torques, of the drive train controller according to FIG. 1 during a starting operation.

Within the framework of programs such as are processed by the fuzzy logic computer or controller from U.S. Pat. No. 5,390,117 (EP 0 576 703 A1), the detection circuit 50 processes fuzzy logic programs as follows:

The fuzzy logic program for the detection circuit 50, which can also be embodied as a subroutine within the IPM controller, is as follows: A particularly advantageous use of information which is relevant to the driving strategy and to the driving situation is configuring the starting operation as a function of said information. If the motor vehicle is provided with a customary clutch control system, a predefined profile of the engine speed or else the differential rotational speed, i.e. the slip, is produced when starting (FIG. 2). It is to be noted that although a dry clutch is mentioned in the text, the explanations can also equally well apply to a wet-running, hydraulically activated clutch.

FIG. 2 illustrates the variation over time of the following variables when a motor vehicle starts: the engine speed ne, the transmission input rotational speed n,in, and the transmission output rotational speed n,out. If the driver of a stationary motor vehicle depresses the accelerator at a time t0, given a clutch which is still open the engine speed is increased until the clutch is engaged at a time t1. The vehicle then begins to accelerate—due to the transmission of the engine torque via the drive train. The rotational speed ne at the time t1 has a decisive influence on the drivability of the vehicle because the engine speed which is set is coupled to an associated engine torque. This influences the metering of the engine speed, for example when maneuvering, when accelerating and when traveling uphill. In addition, it influences the fuel consumption. Unadaptive engine speeds can also led to the engine stalling.

Furthermore, the engine torque tq,eng and the wheel torque tq(wheel) which are requested or brought about by the driver with the accelerator pedal are illustrated. In conventional drive train controllers, the wheel torque is a variable which results from the engine torque and the transmission ratio, and in such cases it is not used as a control variable for controlling the drive train. Conventional drive train controllers also use just one characteristic curve for the starting operation. On the other hand, for different starting situations the present drive train controller 1 uses characteristic curves which are respectively adapted to said situations.

A dashed line A (FIG. 2) represents the profile of the engine speed ne which is typical for maneuvering, a line B represents its profile for a comfortable starting operation with reduced rotational speed and optimum efficiency and a line C represents the profile of ne for what is referred to as a "racing start" or for starting on an incline.

The adaptation of the engine speed, applied here for the first time to the respective starting situation, takes into account the interaction between the engine speed which is set by the clutch controller and the characteristics of the respective engine. A higher engine torque, or even the maximum engine torque, is only reached at rotational speeds above 3000 rpm (this applies in particular to gasoline engines).

Taking into account the engine characteristics makes it possible to implement the best possible acceleration immediately. This means that the drive train is controlled as a function of the ambient and driving conditions. If, for example, a driver suddenly accelerates his motor vehicle strongly when the transmission controller is in the economy driving program, the drive train controller 1 first increases the engine speed and then engages the clutch 52. This brings about a more rapid acceleration than the customary increasing of the engine torque with the clutch closed.

The adjustment or control of the engine speed by the clutch controller 4 therefore indirectly influences the engine torque. For this purpose, the necessary information relating to the detection of the driving situation by the detection circuit 50 is transferred to the local clutch controller 40 via the lines 25, 41. This then converts the information by selecting a characteristic curve corresponding to the starting situation—which will be explained further below—into an effective control operation. Specific characteristic curves can also be provided for the winter mode or operation in which the clutch is subjected to high thermal loading.

What is referred to as a meta controller 16 can parameterize the clutch controller 40 in accordance with the driver's stipulations. It has characteristic curves for the engine speed in the form of a function ne=f(q,eng,nom; t), tq,eng,nom being the requested engine torque and t being the time.

Here, the driver can request, via the accelerator pedal 6, a throttle valve position or a setpoint engine torque tq,eng, nom depending on the engine controller which is present. It will be assumed in the present example that, despite a constant accelerator pedal position, the engine torque varies with the engine speed such as corresponds, for example, to the behavior of an engine with mechanical engine load control.

A more advantageous way of adapting the drive train controller 1 to different driving styles and starting conditions is achieved with the following exemplary embodiment: here, the engine torque, and thus also the wheel torque, is not only influenced indirectly by engine speed profiles which are adapted to the clutch controller and determined by the gear-shifting strategy, but the engine torque is additionally controlled in order to achieve a setpoint wheel torque profile which is calculated from the accelerator pedal position.

It is therefore assumed that the accelerator pedal basically stipulates a setpoint wheel torque. This is determined, for example, by using driving situation information such as is described in German published patent application DE 196 48 055 A1. The control strategy basically follows this method of (primary) accelerator pedal interpretation.

The setpoint wheel torque which is determined in this way is broken up into setpoint stipulations for the engine torque and the clutch strategy on the one hand and for the engine setpoint speed on the other. This results directly in an impressed control of the engine, which is dynamically optimized. Influencing the wheel torque indirectly by controlling the rotational speed, and therefore by means of the engine torque, is eliminated in this exemplary embodiment, the drive train strictly follows the stipulation of the driver and this facilitates the drivability of the motor vehicle. The following relationship applies:

$$tq, eng, nom = tq, wheel, nom / I \qquad (I)$$

wherein:

tq,eng,nom is the setpoint engine torque

I is the transmission ratio of the engaged starting gear speed, and nom is a setpoint value There are different possible ways of implementing the requested the setpoint torque tq,eng,nom as a function of ne. This will now be explained with reference to FIG. 3.

Because neither a dry clutch nor a wet clutch (of the laminated type) is capable, in contrast to a torque converter, of amplifying torque, in such clutches the setpoint engine torque is derived directly from the setpoint wheel torque, as is apparent from equation (I). If the requested wheel torque is to be used as efficiently as possible when starting, a consumption-optimized characteristic curve A must be followed in the characteristic diagram according to FIG. 3. This characteristic curve is generated together with the engine-consumption characteristic diagram and it is used to determine the engine speed value with the minimum consumption for a specific wheel or engine torque request, i.e. the engine speed which results in the smallest fuel consumption. As a result, the control variables tq,eng,nom and tq,clutch for the engine controller and the clutch controller can be formed. Dynamic torque components, which are necessary, for example, for setting the engine speed to a specific value, are neglected here.

The setpoint engine torque is set by means of the rotational speed regulator in the clutch controller 40. The target rotational speed for this rotational speed regulator is also acquired with reference to the characteristic curve AP,eco. The setpoint engine speed n,eng,nom derived from the diagram in FIG. 3 corresponds to the starting rotational speed at the time t1 (FIG. 2) at which the clutch begins to close (what is referred to as the contact point). In the further profile up to the complete closure of the clutch at the time t2, the engine speed can be adjusted according to FIG. 2 if the load request changes (curve D).

In particular the simple drive train controllers which do not have a rotational speed controller, clutch position characteristic curves can be stored in a characteristic curve store—instead of the setpoint rotational speed profiles as a function of the setpoint torques. A time function is superimposed on them in order to reduce the clutch slip.

The described control of the drive train by reference to the AP,eco characteristic curve of FIG. 3 results in a very low fuel consumption during starting operations. Wear to the clutch is effectively reduced by low differential rotational speeds. All the torques required by the driver (up to the absolute torque maximum M) can be obtained with the characteristic curve AP,eco with different rotational speeds—depending on the predefined operating strategy. Given a multiple request of torque in a large step, such as corresponds to the transition from a point x1 (n,eng,nom, eco) to a point M (n,eng,nom,power1) in the characteristic diagram of FIG. 3, declutching is performed in order to supply the engine with torque to increase the speed revs. This is represented by the following equation:

$$delta\_ne, eng, nom = (tq, eng/J) * delta\_t \quad (II)$$

wherein:

J is the moment of inertia of the engine delta_ne,eng,nom is the jump in rotational engine speed delta t is the necessary timeslots However, this operation reduces the driving performance. It is therefore better when there is an intention by the driver to accelerate detected (for example from the driving style) in a predicted fashion by the IPM controller 16, or when there is high road resistance, to set a relatively high engine speed level, such as corresponds to the characteristic curve AP,power1. As a result, prompt, uniform starting and acceleration of the vehicle is achieved. In the case of vehicles with a sporty character, the characteristic curve AP,power2 can also be used (for what is referred to as a racing start) or else in a driving-performance-oriented situation (for example when overtaking). This can also be manually triggered specifically also in other operating modes if it is possible for the driver to intervene above and beyond the automatic generation of operating points (there are frequently corresponding momentary-contact control switches in the motor vehicle for controlling the selection of gear-shift program).

The performance-oriented characteristic curves also constitute a good possible way of providing enjoyment in driving or drivability, for example in the case of a racing start or when starting on an incline. However, the clutch here is subjected to high thermal stressing because it must take up a high differential rotational speed. AP,power2 is the characteristic curve with the maximum torque, DK=cont is the curve with a constant throttle valve position and VL is the full-load characteristic curve of the engine.

The consumption-optimized characteristic curve AP,eco which intersects perpendicularly the lines of constant specific consumption which are not illustrated in the drawing ensures, on the other hand, the lowest consumption when different engine torques are requested. This is decisive in the town cycle mode in order to implement minimum consumption values. Furthermore, depending on the mode of operation of the engine (for example in the case of GDI: stratified charging/homogenous mode) different profiles can be impressed on the operation of the engine in order to obtain favorable working ranges of the engine with respect to the combustion stability.

Excessive generation of heat in the clutch, which is detected, for example, by means of a thermal model calculation in the IPM controller 16, can lead to a reduction in the engine setpoint rotational speed ne,nom during persistent starting operations (for example permanent starting at an incline). It is important to communicate this change in system behavior to the driver (by means of an audible or visual warning signal). The drive train controller 1 generally ensures the best solution for the respective starting operation without the driver having to stipulate this (for example by means of momentary contact control switches).

A further useful feature of the drive train controller 1 is the creep mode of the motor vehicle. It relates to the maneuvering operating case and is controlled with the AP,creep characteristic curve (FIG. 3). In the exemplary embodiment according to FIG. 2, the accelerator pedal is also scaled, specifically by means of the IPS controller 16, which also detects this operating case. Here, the sensitivity is reduced for small accelerator pedal values. Furthermore, early engagement is appropriate in order to limit the grinding time of the clutch 52. In the "increased load" operating case, the setpoint engine speed must, on the other hand, be increased.

The setpoint wheel torque stipulation in the drive train controller 1 results in a further degree of freedom during the control operation, which is used to make a driving-situation-specific assignment of the accelerator pedal position to the setpoint wheel torque. In this way, a low wheel torque with an identical accelerator pedal position can be achieved in the maneuvering mode or in the reverse travel mode, as a result of which the vehicle can be moved in a more sensitive way. This provides considerable improvements over exclusive handling of this mode by controlling the setpoint engine speed.

This possibility can be expanded to such an extent that behavior similar to a torque converter is produced. An example of this is that a large starting resistance requires a larger wheel torque. In this case, a relatively large setpoint wheel torque is predefined with a resulting higher engine torque. As a result of this increase in the engine torque, it is unnecessary to increase the engine speed further, as a result of which the wear on the clutch is reduced. By specifying the working points of the drive train controller 1 with the characteristic curves AP,power1 and AP,power2, the respectively most favorable engine speed level is made available with a sufficient engine torque margin.

If the respective starting conditions require it, intermediate values can also be generated between the characteristic curves in FIG. 3, for example by an interpolation between the characteristic curves AP,eco and AP,power1 or AP,power2.

Figure 4:
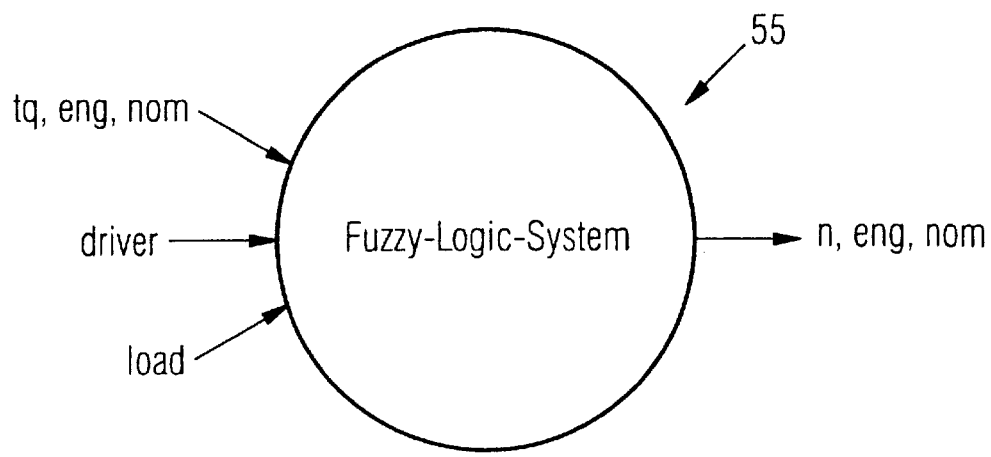
FIG. 4 shows a fuzzy logic system of the drive train controller of FIG. 1.

In addition to the described generation of setpoint rotational speeds with reference to characteristic curves, they can also be generated with a a fuzzy logic system 55 (FIG. 4). This system receives, as input signals, the variables tq,eng,nom, driver's value and/or load value and calculates a setpoint engine speed n,eng,nom from them. Such a fuzzy logic system is described in the aforementioned paper by F. Graf and H. Weil. It processes here a fuzzy logic rule set composed of the following rules:

Rule 1: IF tq,eng,nom IS high AND driver IS sporty THEN n,eng,nom IS very high.

Rule 2: IF tq,eng,nom IS high AND load IS high THEN n,eng,nom IS very high.

Rule 3: IF tq,eng,nom IS med AND load IS high THEN n,eng,nom IS med.

Rule 4: IF tq,eng,nom IS med AND driver IS economy THEN n,eng,nom IS med.

Rule 5: IF tq,eng,nom IS med AND driver IS sporty THEN n,eng,nom IS med high.

Rule 6: IF tq,eng,nom IS low THEN n,eng,nom IS low.

Basically, all these characteristic curves stored in characteristic diagrams and the fuzzy system output variables with the same values can also be transferred to a clutch control system 16, 40 which has, as control variable, the differential speed between the engine speed and the transmission input speed. However, the setpoint value stipulation must drop to zero here by the time t2.

The wheel torque is sensed in the IPM controller 16. This can bring about a correction of the wheel torque—in addition to a stipulation of the engine torque by the driver to the engine controller 2 via the accelerator pedal 6. Said correction is carried out by means of the circuit components 27, 28 and the lines 18–21 and 37 of the driver train controller 1. The setpoint wheel torque is transformed into a (corrected) setpoint engine torque by the decision circuit 27.

The clutch controller 40 determines the requested setpoint wheel torque, and thus the setpoint clutch torque (the engaged gearspeed is known to the clutch controller), via the line 42. In this way, pilot-control of the position of the clutch can be carried out and a better control quality can be achieved. Via the line 43, the IPM controller 16 is informed if there are restrictions in the clutch function, for example in the case of overheating. A resulting failure of driving-performance-oriented maneuvers or of creep mode i.e. an elimination of operating modes which bring about a power loss in the clutch, can, if necessary, be compensated by increasing the wheel torque, and thus the engine torque (only when the clutch is closed). This reduces the wear on the clutch lining.

Here, a further advantage of the drive train controller 1 becomes clear: the engine torque can also be controlled as a function of the clutch state, specifically, if necessary, without taking into account the predefined wheel torque which is only present once the clutch has been completely closed.

If the gear-shifting components 10, 16, 26–28, 40 and the associated signal lines are combined, they form an integrated clutch and engine management system. The characteristic curves shown in FIG. 3 are, as mentioned above, stored in the characteristic diagram store 51 of the IPM controller 16, which constitutes an integrated implementation of the control system of a drive train and is therefore also referred to as meta controller.

A further advantage of such a drive train controller 1 with integrated engine control is that changes in rotational speed caused by the clutch control do not entail any change, for example, reduction, in the engine torque. This can occur in systems which, as it were, clamp the accelerator pedal between the minimum and maximum torques and full load because these extreme values are dependent on the rotational speed. This can lead to the effect that the wheel torque drops—and has to be compensated by the driver. The IPM controller as meta controller decouples the operational variables, with the result that the engine torque tq,eng,req requested by the driver can be corrected via the (interface) line 37, specifically by transferring a differential torque delta tq,eng,req via the line 37.

Not only a static correction value sent by the transmission controller 3 to the engine controller 2 via line 37, but, if necessary, the torque dynamics of the engine can also be influenced via a separate transmission channel. This is advantageous if the dynamics of the clutch control are lower with respect to the torque than that of the engine. In addition, it is advantageous that, with the exception of the necessary interfaces, the engine controller 2 can remain unchanged for various types of engine, in particular as far as the interpretation of the position of the accelerator pedal is concerned.

The characteristic curves store or the fuzzy logic system can also be localized in the clutch controller 40 in another exemplary embodiment. In this case, the drive train is controlled by means of the requested engine torque tq,eng,req (which is calculated in the engine controller 2). The necessary information is fed to the transmission and clutch controller 3 via the interface lines 18–21.

A further variant of the drive train control is to directly stipulate a setpoint engine speed to the engine controller 3 via the line 44. The setpoint engine speed is then regulated by means of a rotational speed regulator of the engine controller 3. This variant has the advantage that the clutch controller 40 does not need to contain an engine-specific regulator or regulator parameters. In addition, the possibility of a collision between regulators contained in the clutch controller 40 and in the engine controller 3 is eliminated. Instead, the engine controller contains a decision logic unit with which the adjustment of the rotational speed is uniquely defined.

I claim:

1. A controller for a drive train of a motor vehicle having an engine, a transmission, and an automatically activated clutch, comprising:

an engine controller configured to control variables influencing a torque of the engine;

a transmission controller configured to control gear-shifting operations of the automatic transmission and connected to said engine controller for exchanging with said engine controller data permitting a comfortable operation of the motor vehicle;

a detection circuit connected to said transmission controller for determining a respective driving situation of the motor vehicle and a driver's characteristics;

a control device for controlling the clutch, said control device being adaptively controlled with respect to one of the driving situation determined by said detection circuit and the driver's characteristics when the motor vehicle starts; and said control device, when the motor vehicle starts, transferring to said engine controller signals with which the engine speed is controlled according to stored characteristic curves.

2. The drive train controller according to claim 1, wherein said detection circuit forms a part of said transmission controller.

3. The drive train controller according to claim 1, wherein said control device forms a part of said transmission controller.

4. The drive train controller according to claim 1, which further comprises a switching controller configured to calculated a setpoint wheel torque from a position of an accelerator pedal, said switching controller controlling an engine torque with reference to the setpoint wheel torque.

5. The drive train controller according to claim 1, wherein said detection circuit for detecting the respective driving situation of the motor vehicle forms a part of said engine controller.

6. The drive train controller according to claim 1, wherein said detection circuit comprises a fuzzy logic system.

7. The drive train controller according to claim 1, which further comprises a characteristic diagram memory storing characteristic curves for controlling the clutch upon starting and upon maneuvering of the motor vehicle.

8. The drive train controller according to claim 7, wherein said characteristic diagram memory stores a plurality of characteristic curves corresponding to different starting situations of the motor vehicle.

9. The drive train controller according to claim 1, which comprises a fuzzy logic system for generating an engine setpoint rotational speed with reference to at least one parameter selected from the group consisting of an engine setpoint torque, a parameter characterizing the driver, and a parameter characterizing a loading of the vehicle.

10. The drive train controller according to claim 5, wherein characteristic curves in the form of a profile of the engine speed are stored in said switching controller as a function of the setpoint engine torque and of the time.

11. The drive train controller according to claim 10, which comprises a rotational speed regulator contained in said clutch controller for setting a setpoint engine torque with reference to a characteristic curve.

12. The drive train controller according to claim 1, wherein is configured with a creeping mode controlled with a characteristic curve.

* * * * *